(12) United States Patent
Miljavec et al.

(10) Patent No.: US 10,892,088 B1
(45) Date of Patent: Jan. 12, 2021

(54) STATIONARY DEVICE FOR CONTACTLESS ELECTRICAL ENERGY TRANSMISSION

(71) Applicant: Texas Institute of Science, Inc., Richardson, TX (US)

(72) Inventors: Damijan Miljavec, Ljubljana (SI); Mario Vukotic, Ljubljana (SI); Selma Corovic, Ljubljana (SI); Laslo Olah, Richardson, TX (US)

(73) Assignee: Texas Institute of Science, Inc., Richardson, TX (US)

( * ) Notice: Subject to any disclaimer, the term of this patent is extended or adjusted under 35 U.S.C. 154(b) by 0 days.

(21) Appl. No.: 16/987,309

(22) Filed: Aug. 6, 2020

Related U.S. Application Data

(60) Provisional application No. 62/975,940, filed on Feb. 13, 2020.

(51) Int. Cl.
| | | |
|---|---|---|
| *H01F 38/14* | (2006.01) | |
| *H02J 50/10* | (2016.01) | |
| *H02J 50/00* | (2016.01) | |
| *H01F 3/14* | (2006.01) | |

(52) U.S. Cl.
CPC .............. *H01F 38/14* (2013.01); *H01F 3/14* (2013.01); *H02J 50/005* (2020.01); *H02J 50/10* (2016.02)

(58) Field of Classification Search
CPC .. H01F 38/14; H01F 3/14; H02J 50/10; H02J 50/005
See application file for complete search history.

(56) References Cited

U.S. PATENT DOCUMENTS

| | | | |
|---|---|---|---|
| 3,801,022 A | 4/1974 | Cassey | |
| 5,519,262 A * | 5/1996 | Wood | H02J 5/005 307/104 |
| 6,526,293 B1 | 2/2003 | Matsuo | |
| 7,317,177 B2 * | 1/2008 | Loveless | H05B 6/101 219/643 |
| 7,443,057 B2 | 10/2008 | Nunally | |
| 7,705,565 B2 | 4/2010 | Patino et al. | |
| 9,190,849 B2 | 11/2015 | Won et al. | |
| 9,796,280 B2 * | 10/2017 | McCool | B60L 11/182 |
| 10,304,617 B2 * | 5/2019 | Maikawa | H01F 38/14 |
| 2006/0113955 A1 | 6/2006 | Nunally | |
| 2007/0178945 A1 | 8/2007 | Cook et al. | |

(Continued)

*Primary Examiner* — Jared Fureman
*Assistant Examiner* — Michael J Warmflash
(74) *Attorney, Agent, or Firm* — Scott Griggs; Griggs Bergen LLP

(57) ABSTRACT

A contactless charging apparatus and method for contactless charging are disclosed. In one embodiment of the contactless charging apparatus, a primary electromagnetic structure and a secondary electromagnetic structure are disposed in an opposing relationship with primary wedges of the primary electromagnetic structure facing secondary wedges of the secondary electromagnetic structure with a non-magnetic gap therebetween. Coils may be positioned in spaces defined by circumferentially slotted areas between the primary and the secondary concentric cores. A non-resonance circuit is formed between the primary electromagnetic structure and the secondary electromagnetic structure to provide a contactless electrical energy transmission from the primary electromagnetic structure to the secondary electromagnetic structure with the use of a time-varying electromagnetic field.

20 Claims, 4 Drawing Sheets

(56) References Cited

U.S. PATENT DOCUMENTS

| | | | |
|---|---|---|---|
| 2008/0014897 A1 | 1/2008 | Cook et al. | |
| 2008/0099469 A1* | 5/2008 | Loveless | H05B 6/101 |
| | | | 219/643 |
| 2018/0114629 A1* | 4/2018 | Maikawa | B60L 5/00 |
| 2019/0013135 A1* | 1/2019 | Shirouzu | H01F 3/14 |
| 2019/0348864 A1* | 11/2019 | Pinciuc | H04B 5/0081 |
| 2020/0139828 A1* | 5/2020 | Laemmle | H01F 27/36 |

* cited by examiner

STATIONARY DEVICE FOR CONTACTLESS ELECTRICAL ENERGY TRANSMISSION

PRIORITY STATEMENT & CROSS-REFERENCE TO RELATED APPLICATIONS

This application claims priority from U.S. Patent Application No. 62/975,940 entitled "Contactless Charging Apparatus and Method for Contactless Charging" filed on Feb. 13, 2020 in the names of Damijan Miljavec et al., which is hereby incorporated by reference, in entirety, for all purposes.

TECHNICAL FIELD OF THE INVENTION

This invention relates, in general, to electrical energy transmission, and, in particular, to a contactless charging apparatus and method for contactless charging for the transmission of electrical energy to supply power to a battery of an electronic device, for example.

BACKGROUND OF THE INVENTION

The transmission of electrical energy between two electric devices is usually accomplished by using electrically conductive or galvanic contacts, such as a cable with plugs. Plug contact surfaces with different electric potentials, such as different phases of an AC supply or positive and negative terminals of a DC supply are electrically insulated from each other and sometimes also from the surroundings. If the surrounding medium is electrically non-conductive, as with air, the operation is safe and reliable, provided that the safety measures defined in standards and other technical documents are employed.

In some cases, using a cable with plugs for electrical energy transmission might be impractical, unsuitable or even impossible. Such examples, where avoiding a cable with plugs for energy transmission would be reasonable, include but are not limited to wireless mobile phone charging, wireless charging of the battery in the hybrid or battery electric vehicle, underwater operation, and operation in highly explosive areas, for example. In such cases, a different approach has to be implemented, i.e. contactless electrical energy transmission. The term "contactless" refers to the non-existence of electric or galvanic contact in this case.

The most popular contactless or wireless electrical energy transmission systems use electromagnetic induction for the energy transfer from the source to the load through air or other medium and are often referred to as "inductive transmission systems." The primary coil on the source side generates a time varying magnetic field, which is then captured by the secondary coil. Depending on the amount of the captured magnetic field and the intensity of its variation in time, different voltage can be induced in the secondary coil. This voltage then drives the current through the load. Inductive transmission systems, which are currently used, have relatively large distances between the primary and secondary coil and employ, partial or full, air coils. This leads to a magnetic circuit with large reluctance, which demands high magnetizing current and/or high frequency operation for a sufficient amount of energy to be transferred in a reasonable time. High frequency also limits the range of the materials that could be used in such a device. To reduce the amount of magnetizing current from the source, a resonant electric circuit is often utilized. As a result, there is a continuing need for improved design for wireless electrical energy transmission systems.

SUMMARY OF THE INVENTION

It would be advantageous to achieve a contactless charging apparatus and method for using the same for providing wireless electrical energy transmission that would improve upon existing limitations in stability and functionality. It would also be desirable to enable an electromagnetic and mechanical solution with minimal reluctance while transmitting a sufficient amount of energy in a reasonable time. Therefore, a contactless charging apparatus and method for contactless charging are disclosed. In one embodiment of the contactless charging apparatus, a primary electromagnetic structure and a secondary electromagnetic structure are disposed in an opposing relationship with primary wedges, which may be teeth-like, of the primary electromagnetic structure facing secondary wedges, which may also be teeth-like, of the secondary electromagnetic structure with a non-magnetic gap therebetween. Coils may be positioned in spaces defined by circumferentially slotted areas between the primary and the secondary concentric cores. A non-resonance circuit is formed between the primary electromagnetic structure and the secondary electromagnetic structure to provide a contactless electrical energy transmission from the primary electromagnetic structure to the secondary electromagnetic structure with the use of a time-varying electromagnetic field. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
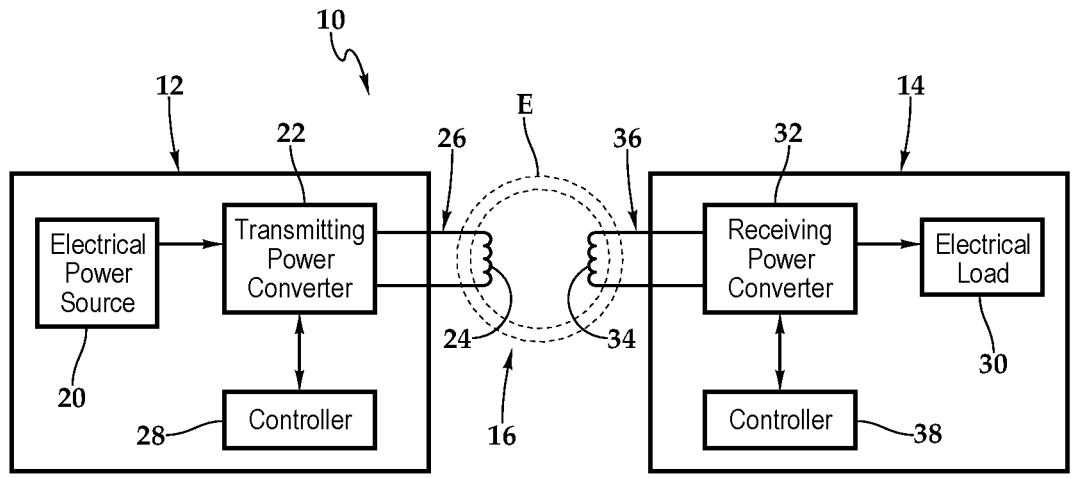
FIG. 1 is a functional block diagram of one embodiment of a contactless charging apparatus, according to the teachings presented herein.
Figure 2:
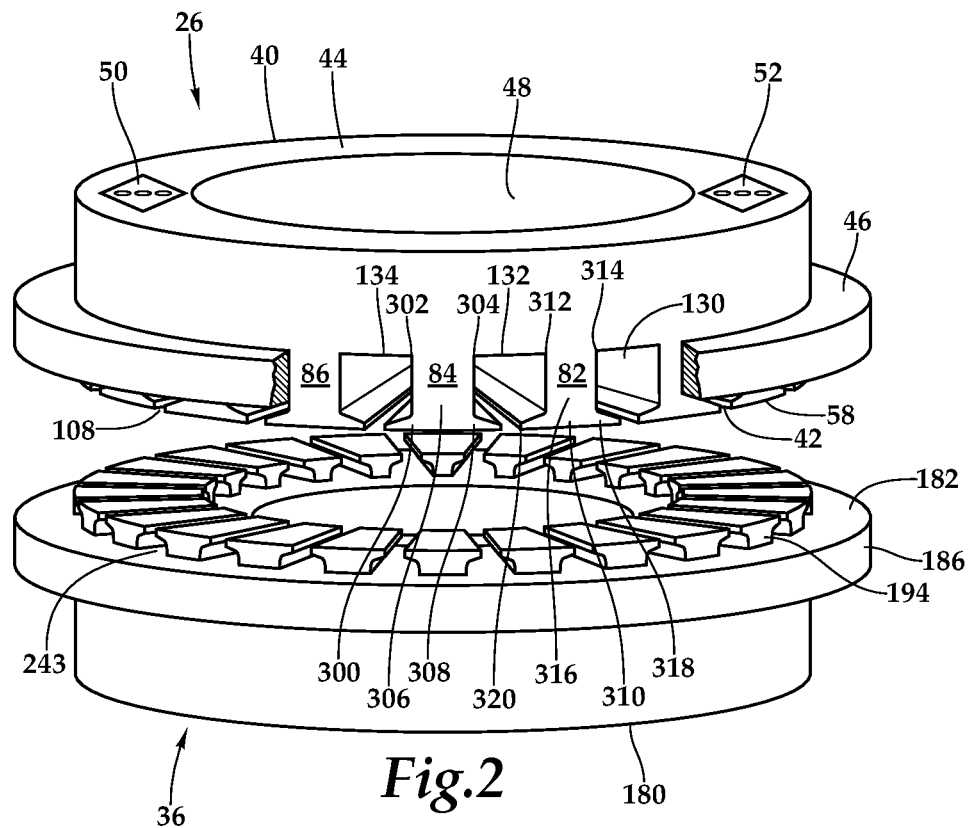
FIG. 2 is a front perspective view, in partial cross-section, of one embodiment of a primary electromagnetic structure and a secondary electromagnetic structure, which form a portion of the contactless charging apparatus depicted in FIG. 1.
Figure 3:
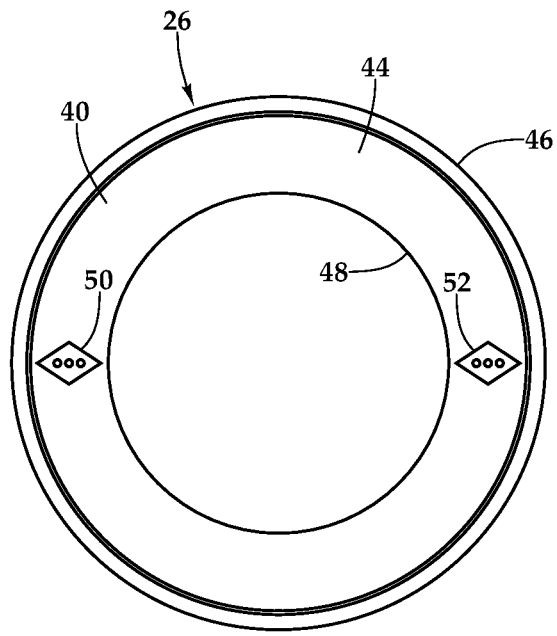
FIG. 3 is an exterior plan view of the primary electromagnetic structure depicted in FIG. 1.
Figure 4:
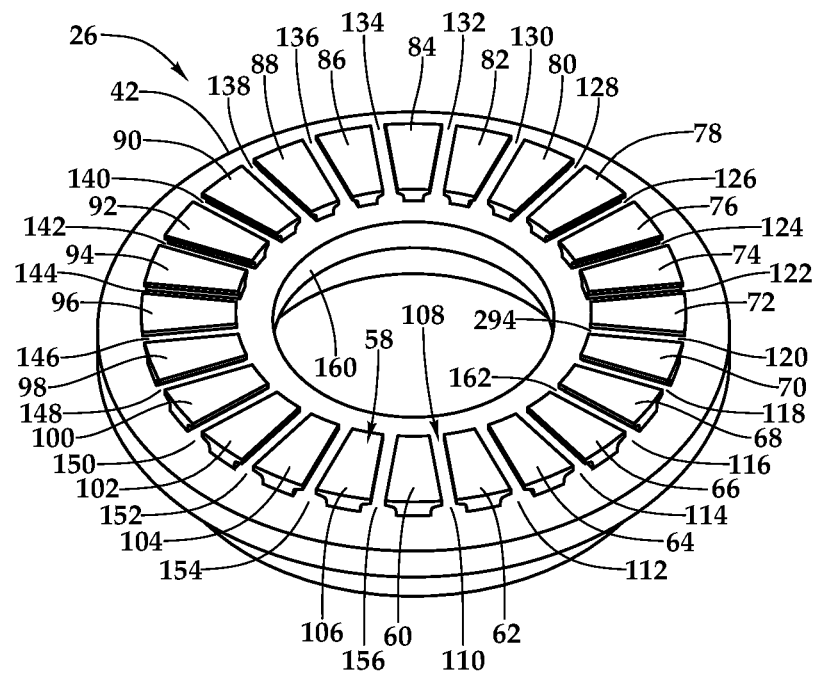
FIG. 4 is an interior perspective view of the primary electromagnetic structure depicted in FIG. 1.
Figure 5:
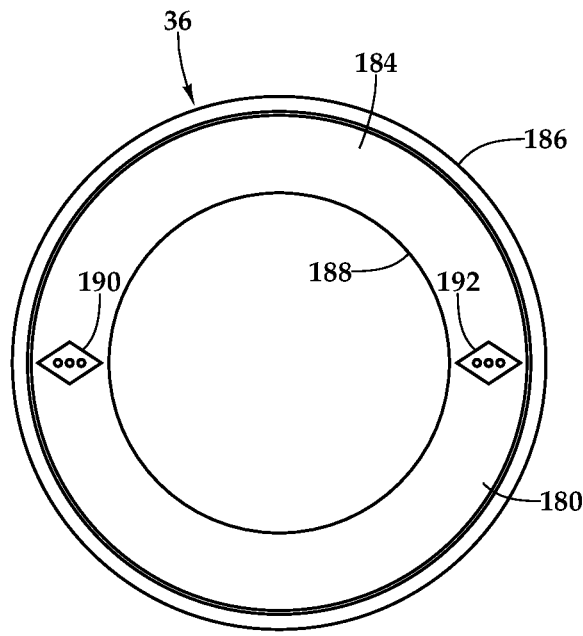
FIG. 5 is an exterior plan view of the secondary electromagnetic structure depicted in FIG. 1.
Figure 6:
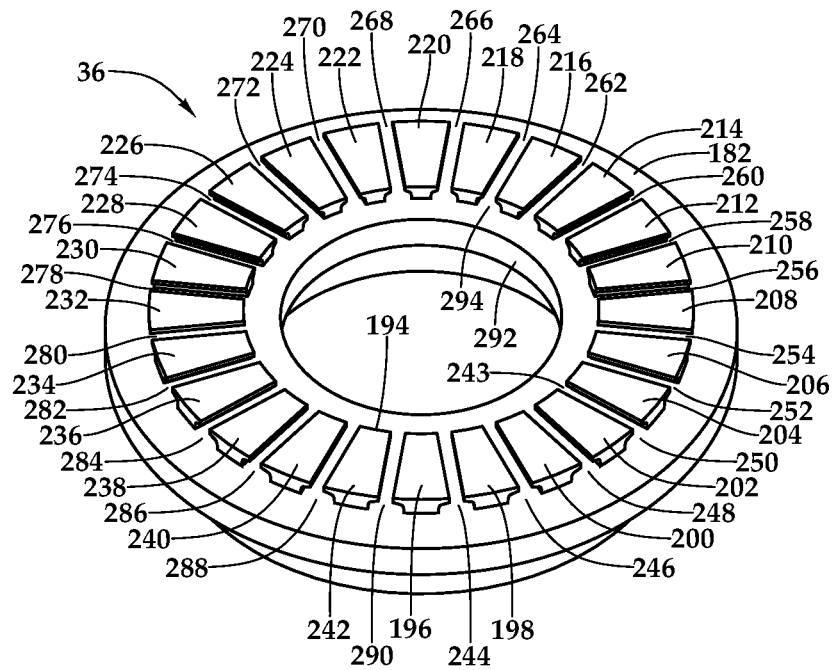
FIG. 6 is an interior perspective view of the secondary electromagnetic structure depicted in FIG. 1.

Referring now to FIG. 1, therein is depicted one embodiment of a contactless charging apparatus, which is schematically illustrated and designated 10. A power transmitting structure 12 and a power receiving structure 14 are separated by a non-magnetic gap 16 therebetween. The power transmitting structure 12 includes an electrical power source 20, such as a battery, capacitor, or electrical plug and socket, for example, providing a power source for the transmitting power converter 22 having coils 24 within a primary electromagnetic structure 26. As shown, the transmitting power converter 22 is under the control of a controller 28. Similarly, the power receiving structure 14 includes an electrical load 30, such as a battery, providing a load for a receiving power converter 32 having coils 34 within a secondary electromagnetic structure 36. As shown, the receiving power converter 32 is under the control of a controller 38. In operation, power is transferred from the electrical power source to the electrical load 30 via the primary electromagnetic structure 26 and the secondary electromagnetic structure 36 as indicated by energy transmission E. More particularly, as will be described in greater detail hereinbelow, the primary electromagnetic structure 26 has windings that are supplied with time-varying electrical currents, which induce time-varying voltage in the secondary-side windings associated with the secondary electromagnetic structure 36. The induced voltages in the secondary-side windings may be rectified in order to drive DC electrical current through the electrical load 30, directly or via receiving power converter 32, for example.

Referring now to FIG. 2 through FIG. 6, in one embodiment, the primary electromagnetic structure 26 has an upper end 40 and an interior end 42. A primary yoke 44, which may be a disc-like form, is located at the upper end 40 and includes, for example, a radial flange 46 extending therefrom toward the interior end 42. An opening 48 is located in the primary yoke 44. Wiring openings 50, 52 provide a connection with the electrical power source 20 and the controller 28, for example. As shown, the primary yoke 44 includes primary wedges 58 extending therefrom at the interior end 42 of the primary electromagnetic structure 26. In one implementation, the primary wedges 58 include wedges 60, 62, 64, 66, 68, 70, 72, 74, 76, 78, 80, 82, 84, 86, 88, 90, 92, 94, 96, 98, 100, 102, 104, 106. The primary wedges 58 define primary slots 108 which include slots 110, 112, 114, 116, 118, 120, 122, 124, 126, 128, 130, 132, 134, 136, 138, 140, 142, 144, 146, 148, 150, 152, 154, 156 between the primary wedges 58 and an inner space 160, which may be a circumferentially slotted area 162. An arbitrary number of primary wedges 58 and respective primary slots 108 may be present. The primary yoke 44 functions to magnetically connect all primary wedges 58 and to mechanically hold the primary wedges 58 in a fixed position.

In one embodiment, the secondary electromagnetic structure 36 has a lower end 180 and an interior end 182. A secondary yoke 184 is located at the lower end 180 and includes a radial flange 186 extending therefrom toward the interior end 182. An opening 188 is located in the secondary yoke 184. Wiring openings 190, 192 provide a connection with the electrical load 30 and controller 38, for example. As shown, the secondary yoke 184 includes secondary wedges 194 extending therefrom at the interior end 182 of the secondary electromagnetic structure 36. In one implementation, the secondary wedges 194 include wedges 196, 198, 200, 202, 204, 206, 208, 210, 212, 214, 216, 218, 220, 222, 224, 226, 228, 230, 232, 234, 236, 238, 240, 242. The secondary wedges 194 define secondary slots 243 which include slots 244, 246, 248, 250, 252, 254, 256, 258, 260, 262, 264, 266, 268, 270, 272, 274, 276, 278, 280, 282, 284, 286, 288, 290 between the secondary wedges 194 and an inner space 292, which may be a circumferentially slotted area 294. An arbitrary number of secondary wedges 194 and respective secondary slots 243 may be present. As will be appreciated, in one embodiment, the primary electromagnetic structure 26 and the secondary electromagnetic structure 36 are symmetrical.

With reference to the primary wedges 82, 84 and the slot 132 therebetween, in some embodiments, the primary wedges 58, as well as the secondary wedges 194, may be dovetail in shape. As illustrated, the primary wedge 84 includes a dovetail member 300 having a pair of spaced shoulder members 302, 304 intersecting the two adjacent primary slots 134, 132. A socket member 306 extends from the pair of spaced shoulder members 302, 304 with a pin 308 crowning the socket member 306. The primary wedge 82 includes a dovetail member 310 having a pair of spaced shoulder members 312, 314 intersecting the two adjacent primary slots 132, 130. A socket member 316 extends from the pair of spaced shoulder members 312, 314 with a pin 318 crowning the socket member 316. A slot opening 320 is formed between the pin 308 and the pin 318 to provide access to the primary slot 132. It should be appreciated, however, that although the primary wedges 82, 84 are depicted with a dovetail shape providing a dovetail cross-section, the cross-section of the primary wedges 82, 84 may be arbitrary.

In one embodiment, each of the primary yoke 44 and the secondary yoke 184 include a magnetic material, including soft-magnetic materials such as, for example, ferromagnetic materials. In particular, each of the primary yoke 44 and the secondary yoke 184 include a soft-magnetic material, such as annealed iron, for example. Such soft-magnetic materials may stay magnetized but the magnetization may be easily annihilated after the magnetic field is removed. Further, it should be appreciated that the primary electromagnetic structure 26 and the secondary electromagnetic structure 36 may be geometrically inverted such that the primary yoke 44 is located at a lower end of the primary electromagnetic structure 26 and the secondary yoke 184 is located at an upper end of the secondary electromagnetic structure 36. Each of the primary wedges 58 and the secondary wedges 194 may be axisymmetric and composed of teeth members with arbitrary cross-sections. Also, each of the primary wedges 58 may also comprise a soft-magnetic material and, in one implementation, a ferromagnetic material. Each of the primary wedges 58 and the secondary wedges 194 may include a distinct cross section that may be arbitrary, such as an arbitrary polygon.

As a result, in one embodiment, the circumferentially slotted area 162 of the primary electromagnetic structure 26 and the circumferentially slotted area 294 of the secondary electromagnetic structure 36 may also each include a distinct cross section that may be arbitrary, such as an arbitrary polygon. As shown, a number, $N_1$, primary wedges 58 and $N_2$ secondary wedges 194 are present with $N_1$ primary slots 110 and $N_2$ secondary slots 243 for each of the primary electromagnetic structure 26 and the secondary electromagnetic structure 36; namely, the primary slots 110, 112, 114, 116, 118, 120, 122, 124, 126, 128, 130, 132, 134, 136, 138, 140, 142, 144, 146, 148, 150, 152, 154, 156 between the primary wedges 58 and the inner space 160 including the circumferentially slotted area 162 of the primary electromagnetic structure 26; and the secondary slots 244, 246, 248, 250, 252, 254, 256, 258, 260, 262, 264, 266, 268, 270, 272, 274, 276, 278, 280, 282, 284, 286, 288, 290 between the secondary wedges 194 and the inner space 292, which is the circumferentially slotted area 294 of the secondary electromagnetic structure 36. It should be appreciated that the number $N_1$ and the number $N_2$ may be different or the same. Coils or winding coils may be inserted between the slots in the circumferentially slotted area and the circumferentially slotted area 294. In this manner, the circumferentially slotted area 162 and the circumferentially slotted area 294 function as slot entries for the coils and as a magnetic barrier that reduces leakage of the main flux. The main flux is directed, for example, through the primary wedges 58 and non-magnetic gap 16 to the secondary electromagnetic structure 36. It should be appreciated that although a particular number and configuration of the primary wedges 58 and secondary wedges 194 are illustrated, any number of the primary wedges 58 and the secondary wedges 194 may be utilized and be within the teachings presented herein.

In one embodiment, the primary electromagnetic structure 26 and the secondary electromagnetic structure 36 are disposed in an opposing relationship with the primary wedges 58 facing the secondary wedges 194 with the non-magnetic gap 16 therebetween. With this arrangement, contactless electrical energy transmission from the primary electromagnetic structure 26 to the secondary electromagnetic structure 36 may be achieved by employing a closed magnetic circuit, apart from the non-magnetic gap 16 between the primary electromagnetic structure 26 and the secondary electromagnetic structure 36, without the use of resonant electrical circuit and with reasonably low supply frequency, such as a frequency below 5 kHz. In this arrangement, as discussed, the primary electromagnetic structure 26 transmits the electrical energy from the source to the secondary electromagnetic structure 36. In one embodiment, a time-varying electromagnetic field is implemented by the transmitting power converter 22 and the receiving power converter 32 respectfully under the control of controllers 28, 38 to achieve this transmission. In another embodiment, electromagnetic induction is utilized for delivery of energy from the source, such as the electrical power source 20, to the electrical load 30. The electromagnetic induction may include a time-varying electromagnetic field.

In another implementation, contactless electrical energy transmission includes supplying of the primary electromagnetic structure 26 with a fixed voltage and frequency or by controlling either voltage, frequency, or both, where in the case of fixed voltage and frequency, the transmitting power depends on the electrical properties of the load, and in the case of variable voltage and/or frequency, the transmitting power can be controlled from the primary electromagnetic structure 26, for example, with a voltage-frequency (V/f) control method, assuming unchanged geometric relations, i.e. fixed width of non-magnetic gap 16 between the primary electromagnetic structure 26 and the secondary electromagnetic structure 36, during the energy transmission in both cases. By way of example, electrical energy may flow from the primary electromagnetic structure 26 to the secondary electromagnetic structure 36. In many of these embodiments, contactless electrical energy transmission is achieved with arbitrary cross section and circumferential positioning between the primary electromagnetic structure 26 and the secondary electromagnetic structure 36 when electrical energy is transmitted therethrough. Additionally, in some embodiments, the primary electromagnetic structure 26 and the secondary electromagnetic structure 36 have stationary positioning.

The contactless electrical energy transmission from the primary electromagnetic structure 26 to the secondary electromagnetic structure 36 may include supplying the primary electromagnetic structure 26 with a fixed voltage and frequency or by selectively controlling either the voltage or frequency. In the case of a fixed voltage and frequency, the transmitting power depends on the electrical properties of the electrical load 30 and, in the case of a variable voltage and/or frequency, the transmitting power may be controlled from the primary electromagnetic structure 26, assuming geometric relations between the primary electromagnetic structure 26 and the secondary electromagnetic structure 36 remain unchanged. That is, a fixed width of non-magnetic gap 16 between the primary electromagnetic structure 26 and the secondary electromagnetic structure 36 is maintained.

The contactless charging apparatus 10 allows arbitrary axial and circumferential positioning between the primary electromagnetic structure 26 and the secondary electromagnetic structure 36. It should be appreciated, however, that in many implementations, the performance of the contactless charging apparatus 10 improves with small axial distance between the primary electromagnetic structure 26 and the secondary electromagnetic structure 36. That is, a small width of the non-magnetic gap 16 between the primary electromagnetic structure 26 and the secondary electromagnetic structure 36 improves performance.

The stationary positioning of the primary electromagnetic structure 26 and the secondary electromagnetic structure 36 ensures electromagnetic torque is mitigated between the primary electromagnetic structure 26 and the secondary electromagnetic structure 36. In this manner, 360° charging is provided. Electromagnetic torque may lead to the rotation of either the primary electromagnetic structure 26, the secondary electromagnetic structure 36, or both. Rotation may then decrease the transmitted power.

Figure 7:
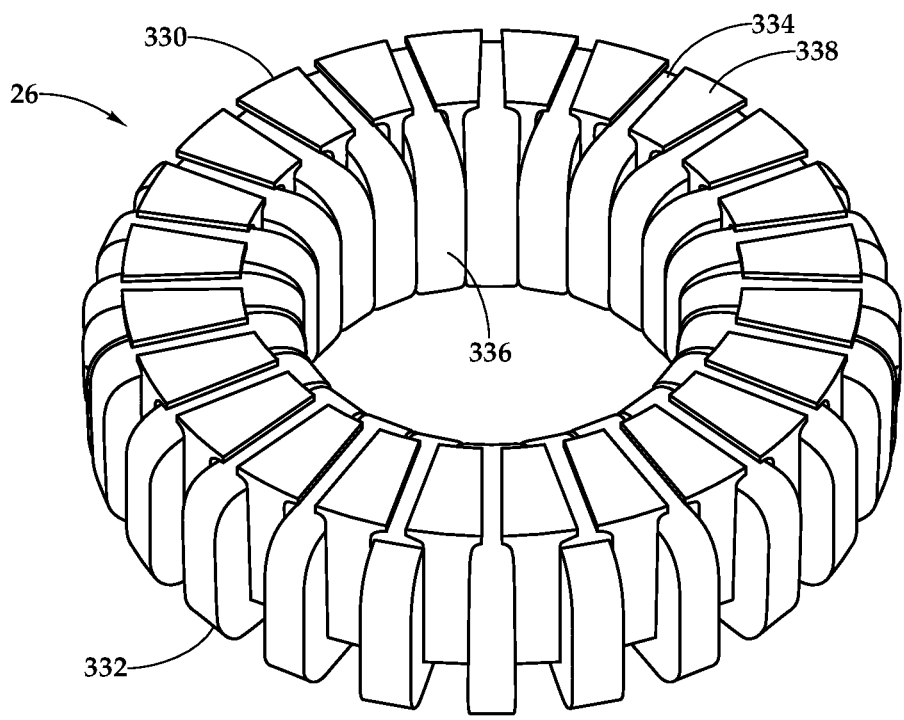
FIG. 7 is an interior perspective view of another embodiment of a primary electromagnetic structure, according to the teachings presented herein.

Referring now to FIG. 7, in another embodiment of the primary electromagnetic structure 26, the primary electromagnetic structure 26 has an end 330 and an end 332. A primary yoke 334, which may be disc-like form, is located at the end 330. An opening 336 is located in the primary yoke 334. Primary wedges 338 extend from the primary yoke 334. It should be appreciated that the type of windings employed may be distributed (see FIGS. 2, 4, and 6), where the end winding occupies the circumferentially slotted areas of the primary electromagnetic structure 26 and the secondary electromagnetic structure 36. Alternatively, as shown in FIG. 7, concentrated coils connected into the winding may be utilized that embrace the appropriate yoke, the primary yoke 334, or the primary wedges 338 associated with a soft-magnetic core.

Figure 8:
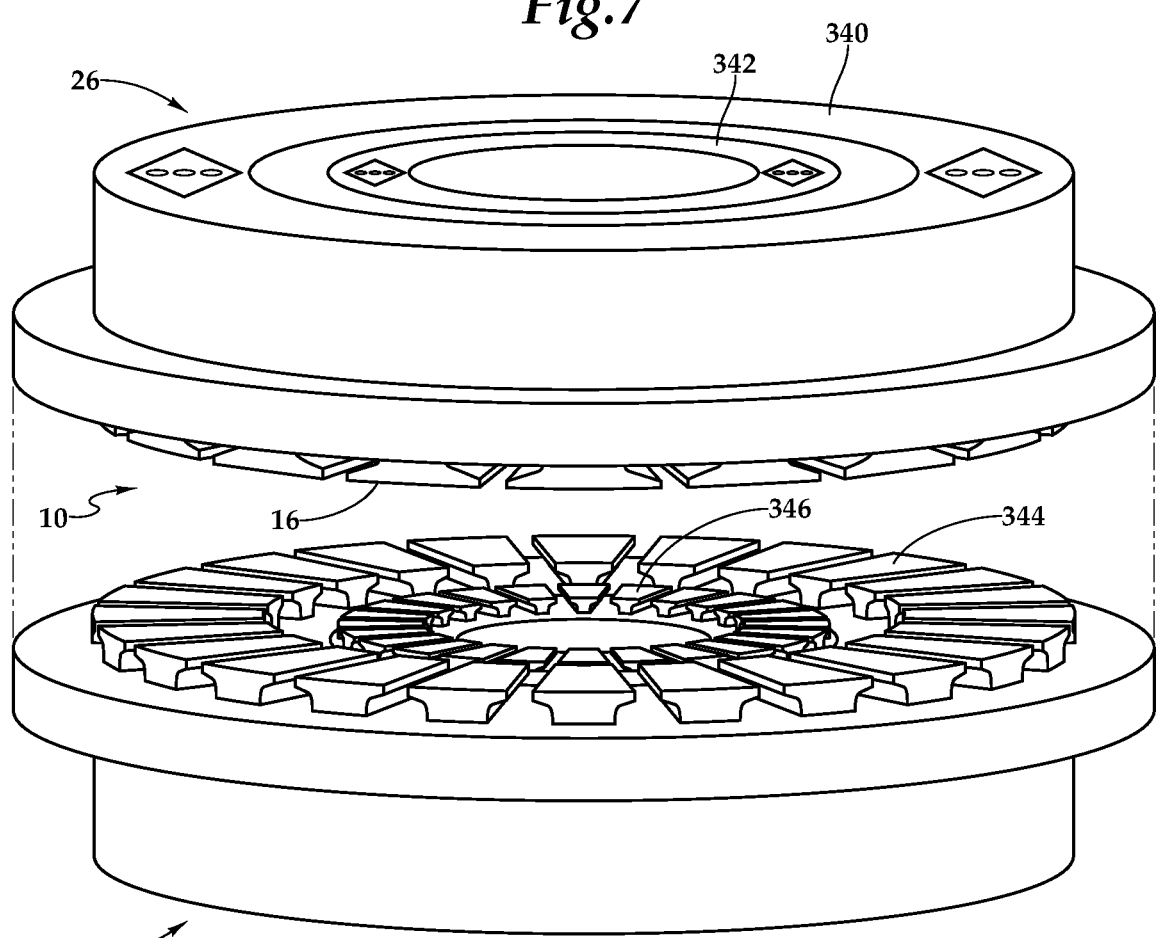
FIG. 8 is a front perspective view of another embodiment of a primary electromagnetic structure and a secondary electromagnetic structure, which form a portion of the contactless charging apparatus depicted in FIG. 1.

Referring now to FIG. 8, in another embodiment of the primary electromagnetic structure 26 and the secondary electromagnetic structure 36, which form a portion of the contactless charging apparatus 10, multiple cores 340, 342, 344, 346 are utilized with the cores 340, 342 respectively opposing the cores 344, 346. It should be appreciated, however, that although four total cores 340, 342, 344, 346 are depicted, any number of cores may be utilized. By increasing the number of cores, the transferred power and system redundancy are increased. The windings, assembled to different soft-magnetic cores, for example, may be electrically connected and supplied from the same power source or supplied independently from different electrical sources. Moreover, although a particular concentrated coil winding is depicted in FIG. 8, it should be appreciated that any form of winding may be utilized, preferably the winding produces time-varying electromagnetic fields in the non-magnetic gap 16 between the primary electromagnetic structure 26 and the secondary electromagnetic structure 36.

The order of execution or performance of the methods and operations illustrated and described herein is not essential, unless otherwise specified. That is, elements of the methods and flows may be performed in any order, unless otherwise specified, and that the methods may include more or less elements than those disclosed herein. For example, it is contemplated that executing or performing a particular step before, contemporaneously with, or after another step are all possible sequences of execution.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A contactless charging apparatus comprising:
   a primary electromagnetic structure having an upper end and an interior end, the primary electromagnetic structure including a primary yoke at the upper end, the primary yoke having a plurality of primary wedges extending therefrom at the interior end of the primary electromagnetic structure, the primary yoke magnetically connecting the plurality of primary wedges;
   the plurality of primary wedges defining an inner space and a plurality of primary slots interposed therebetween, the plurality of primary slots extending radially through the primary yoke and intersecting the interior of the primary electromagnetic structure;
   a secondary electromagnetic structure having a lower end and an interior end, the secondary electromagnetic structure including a secondary yoke at the lower end, the secondary yoke having a plurality of secondary wedges extending therefrom at the interior end of the secondary electromagnetic structure, the secondary yoke magnetically connecting the plurality of secondary wedges;
   the plurality of secondary wedges defining an inner space and a plurality of secondary slots interposed therebetween, the plurality of secondary slots extending radially through the secondary yoke and intersecting the interior end of the secondary electromagnetic structure;
   each of the primary yoke and the secondary yoke including a soft-magnetic material;
   each of the plurality of primary wedges and the plurality of secondary wedges including the soft-magnetic material; and
   the primary electromagnetic structure and the secondary electromagnetic structure being disposed in an opposing relationship with the plurality of primary wedges facing the plurality of secondary wedges with a non-magnetic gap therebetween.

2. The contactless charging apparatus as recited in claim 1, wherein the primary electromagnetic structure and the secondary electromagnetic structure are symmetrical.

3. The contactless charging apparatus as recited in claim 1, wherein the primary electromagnetic structure and the secondary electromagnetic structure form a non-resonance circuit.

4. The contactless charging apparatus as recited in claim 1, wherein the plurality of primary wedges further comprise respective arbitrary cross sections.

5. The contactless charging apparatus as recited in claim 1, wherein the plurality of primary wedges further comprise an arbitrary number of primary wedges.

6. The contactless charging apparatus as recited in claim 1, wherein each of the plurality of primary wedges further comprises a dovetail member.

7. The contactless charging apparatus as recited in claim 1, wherein each of the plurality of primary wedges further comprises:
   a pair of spaced shoulder members intersecting two adjacent slots of the plurality of primary slots;
   a socket member extending from the pair of spaced shoulder members; and
   a pin crowning the socket member.

8. The contactless charging apparatus as recited in claim 7, wherein adjacent primary wedges include respective adjacent pins having a slot opening therebetween.

9. The contactless charging apparatus as recited in claim 1, wherein the plurality of primary slots further comprises an arbitrary cross section.

10. The contactless charging apparatus as recited in claim 1, wherein the plurality of primary slots further comprises an arbitrary number of primary slots.

11. The contactless charging apparatus as recited in claim 1, wherein the plurality of primary slots form a circumferentially slotted area.

12. The contactless charging apparatus as recited in claim 1, wherein a plurality of coils are inserted into the plurality of primary slots.

13. The contactless charging apparatus as recited in claim 1, wherein the primary electromagnetic structure is coupled to a power source.

14. The contactless charging apparatus as recited in claim 1, wherein the secondary electromagnetic structure is coupled to a load.

15. The contactless charging apparatus as recited in claim 1, wherein an electrical energy flows from the primary electromagnetic structure to the secondary electromagnetic structure.

16. The contactless charging apparatus as recited in claim 1, wherein the primary electromagnetic structure and the secondary electromagnetic structure further comprise stationary positioning.

17. The contactless charging apparatus as recited in claim 1, wherein the primary electromagnetic structure and the secondary electromagnetic structure are geometrically inverted such that the primary yoke is located at the lower end of the primary electromagnetic structure and the secondary yoke is located at the upper end of the secondary electromagnetic structure.

18. A contactless charging apparatus comprising:
   a primary electromagnetic structure having an upper end and an interior end, the primary electromagnetic structure including a primary yoke at the upper end, the primary yoke having a plurality of primary wedges extending therefrom at the interior end of the primary electromagnetic structure;
   the plurality of primary wedges defining an inner space and a plurality of primary slots interposed therebetween, the plurality of primary slots extending radially through the primary yoke and intersecting the interior end of the primary electromagnetic structure;

a secondary electromagnetic structure having a lower end and an interior end, the secondary electromagnetic structure including a secondary yoke at the lower end, the secondary yoke having a plurality of secondary wedges extending therefrom at the interior end of the secondary electromagnetic structure;

the plurality of secondary wedges defining an inner space and a plurality of secondary slots interposed therebetween, the plurality of secondary slots extending radially through the secondary yoke and intersecting the interior end of the secondary electromagnetic structure;

each of the primary yoke and the secondary yoke including a soft-magnetic material;

each of the plurality of primary wedges and the plurality of secondary wedges including the soft-magnetic material;

the primary electromagnetic structure and the secondary electromagnetic structure being disposed in an opposing relationship with the plurality of primary wedges facing the plurality of secondary wedges with a non-magnetic gap therebetween; and the primary electromagnetic structure and the secondary electromagnetic structure form a non-resonance circuit that transmits electrical energy from a source coupled to the primary electromagnetic structure to a load coupled to the secondary electromagnetic structure utilizing an electromagnetic induction.

19. The contactless charging apparatus as recited in claim 18, wherein the electromagnetic induction further comprises a time-varying electromagnetic field.

20. A contactless charging apparatus comprising:

a primary electromagnetic structure having an upper end and an interior end, the primary electromagnetic structure including a primary yoke at the upper end, the primary yoke having a plurality of primary wedges extending therefrom at the interior end of the primary electromagnetic structure;

the plurality of primary wedges defining an inner space and a plurality of primary slots interposed therebetween, the plurality of primary slots extending radially through the primary yoke and intersecting the interior end of the primary electromagnetic structure;

a secondary electromagnetic structure having a lower end and an interior end, the secondary electromagnetic structure including a secondary yoke at the lower end, the secondary yoke having a plurality of secondary wedges extending therefrom at the interior end of the secondary electromagnetic structure;

the plurality of secondary wedges defining an inner space and a plurality of secondary slots interposed therebetween, the plurality of secondary slots extending radially through the secondary yoke and intersecting the interior of the secondary electromagnetic structure;

each of the primary yoke and the secondary yoke including a soft-magnetic material;

each of the plurality of primary wedges and the plurality of secondary wedges including the soft-magnetic material;

the primary electromagnetic structure and the secondary electromagnetic structure being disposed in an opposing relationship with the plurality of primary wedges facing the plurality of secondary wedges with a non-magnetic gap therebetween; and the primary electromagnetic structure and the secondary electromagnetic structure form a non-resonance circuit that transmits an electrical energy from a source coupled to the primary electromagnetic structure to a load coupled to the secondary electromagnetic structure utilizing a time-varying electromagnetic field.

\* \* \* \* \*